(12) United States Patent
Pavlyushchik

(10) Patent No.: US 7,665,081 B1
(45) Date of Patent: Feb. 16, 2010

(54) SYSTEM AND METHOD FOR DIFFERENCE-BASED SOFTWARE UPDATING

(75) Inventor: Mikhail A. Pavlyushchik, Moscow (RU)

(73) Assignee: Kaspersky Lab, ZAO, Moscow (RU)

( * ) Notice: Subject to any disclaimer, the term of this patent is extended or adjusted under 35 U.S.C. 154(b) by 831 days.

(21) Appl. No.: 11/382,015

(22) Filed: May 6, 2006

(51) Int. Cl.
*G06F 9/44* (2006.01)
*G06F 15/16* (2006.01)
*G06F 17/30* (2006.01)
(52) U.S. Cl. .................... 717/168; 709/203; 707/10
(58) Field of Classification Search ............... 717/168, 717/174; 709/203; 710/10
See application file for complete search history.

(56) References Cited

U.S. PATENT DOCUMENTS

| 5,787,175 | A | * | 7/1998 | Carter | 713/165 |
| 5,946,686 | A | * | 8/1999 | Schmuck et al. | 707/10 |
| 5,999,740 | A | | 12/1999 | Rowley | |
| 6,167,407 | A | | 12/2000 | Nachenberg et al. | |
| 6,243,766 | B1 | | 6/2001 | Sliger et al. | |
| 6,339,826 | B2 | * | 1/2002 | Hayes et al. | 713/166 |
| 6,651,249 | B2 | | 11/2003 | Waldin et al. | |
| 6,711,557 | B1 | * | 3/2004 | Palaniappan | 706/45 |
| 6,725,377 | B1 | | 4/2004 | Kouznetsov | |
| 6,738,799 | B2 | * | 5/2004 | Dickenson | 709/203 |
| 6,938,109 | B1 | | 8/2005 | Sliger et al. | |
| 2002/0111942 | A1 | * | 8/2002 | Campbell et al. | 707/3 |
| 2002/0178178 | A1 | * | 11/2002 | Peng | 707/204 |
| 2004/0068721 | A1 | * | 4/2004 | O'Neill et al. | 717/168 |

* cited by examiner

*Primary Examiner*—Wei Y Zhen
*Assistant Examiner*—Chih-Ching Chow
(74) *Attorney, Agent, or Firm*—Bardmesser Law Group

(57) ABSTRACT

A system, method and computer program product for software updates includes (a) generating a set of differences between a latest version of a file and a plurality of prior versions of the file, wherein the differences convert any of the plurality of prior versions into the latest version, but not to any other version; (b) publishing the set of differences; and (c) providing, to the client, in response to a client requesting an update to a client's version of the file and the client providing an identifier corresponding to the client's version of the file, a difference between the client's version of the file and one of (i) the latest version of the file, and (ii) a version of the file prior to the latest version.

19 Claims, 9 Drawing Sheets

SYSTEM AND METHOD FOR DIFFERENCE-BASED SOFTWARE UPDATING

BACKGROUND OF THE INVENTION

1. Field of the Invention

The present invention is related to updating of databases and files, such as those used for anti-malware software, and more particularly, to a method and system for difference-based software updating of such files and databases.

2. Description of the Related Art

Some computer software publishers update their software "applications" (computer programs and data files associated with the programs) frequently. For some types of software applications, such as virus protection software, these updates are particularly frequent. Malware protection software applications, such as anti-virus software, are designed to detect computer viruses on a computer system, and may also remove found viruses. Because these anti-malware applications rely on data about specific viruses, worms, adware, spam, firewall vulnerabilities, and because new types of malware are constantly being written to avoid current malware detection capabilities, it is necessary to update malware protection software applications on a regular basis to account for the newest malware. Frequent updating of data files is also necessary for some database publishers, who must put up-to-date information in their databases, and remove obsolete information. Periodic updating of general software applications to expand capabilities and eliminate "bugs" is also common.

Currently, several methods are used to update software applications. The simplest of these is to distribute one entire software application to replace an older one. This "full update" method is expensive and inconvenient. When full updates are distributed over the Internet, they often cause such high loads on servers that other users suffer slow-downs on the network, and the servers have trouble meeting the demands.

Some software publishers distribute "incremental updates." These updates do not contain entire software applications, but rather only that information necessary to transform a given version of a software application to a newer version. Because most software updates involve changes to only a small portion of a software application, only a small data file including the differences between the two versions needs to be distributed.

The use of incremental update methods allows for smaller updates which can be distributed over the Internet. One of the issues related to conventional incremental updates that needs to be addressed is the question of resource utilization on both the client-side and the server side. Currently, anti-malware databases and files are updated relatively frequently, once every few hours, or even once every hour. Using anti-virus software as an example, on the client-side, there is a file, or a set of files that contains the masks of the known viruses and other information. When updated, using conventional incremental update schemes, an update, usually in the form of a small "difference," or "diff," is typically downloaded from the server that includes instructions for modifying the file. In other words, rather than downloading the entire file, only a relatively small amount of data, representing information about the new viruses, is actually downloaded. These "diffs," and are typically in the format of:

Replace line 102 with [ ]
Add line 103 as follows: [ ]
Delete line 121

One difficulty with the conventional approach is the fact that many computers are not continuously connected to the Internet, may be turned off, access to the server may be unavailable, etc. Thus, the version of the file on the client's side may not be the latest version, or the "latest minus one version", but is actually several diffs (or potentially a large number of diffs), old. Furthermore, the general trend in the industry, particularly in the area of combating viruses, trojans, spam, worms, adware, spyware, and other types of malware is that the files and databases need to be updated with increasing frequency, for example, every 15 minutes, or every 5 minutes, or, essentially, continuously. This has significant consequences for structuring the interaction between the client and the server.

On the server side, even though the volume of data that needs to be sent to the individual client might be relatively modest, the problem is compounded when millions, or tens of millions of users continuously request updates from the same server. Self-evidently, the greater the frequency of the updates, the greater the load on the server, even if the response to the request ultimately does not involve any updates—there is overhead involved in responding to any request from the user.

On the user side, it is generally desirable to require as little "intelligence" as possible from the client, as far as figuring out which version of the file the client currently has, which version it needs, and whether it needs to update or not—in other words, it is desirable to reduce, as much as possible any processing on the client-side associated with a client's request to the server for such updates.

Thus, one of the problems with a conventional approach described in U.S. Pat. No. 6,651,249 is the need for the client to download one or more "delta catalogs" and then process them on the client side. This increases the load on the server, and increases the amount of processing needed on the client-side.

Accordingly, there is a need in the art for a method and system that efficiently updates anti-malware and other frequently changing databases and files.

SUMMARY OF THE INVENTION

Accordingly, the present invention is related to a system and method for difference-based software updates that substantially obviates one or more of the disadvantages of the related art.

In one aspect of the invention, there is provided a system, method and computer program product that includes (a) generating a set of differences between a latest version of a file and a plurality of prior versions of the file, where the differences convert any of the plurality of prior versions into the latest version, but not to any other version; (b) publishing the set of differences; and (c) in response to a client requesting an update to a client's version of the file and the client providing an identifier corresponding to the client's version of the file, providing, to the client, a difference between the client's version of the file and one of (i) the latest version of the file, and (ii) a version of the file prior to the latest version.

The differences can be published on, e.g., an FTP server, a DFTP server and an HTTP server. When the difference between the client's version of the file and the latest version of the file is greater than some percentage, the latest version of the file can be provided to the client for download, instead of the difference. The file can include, e.g., virus signatures, spam signatures, spam handling rules, firewall rules, virus names, virus handling rules, antivirus executable code patches, anti-spam executable code diffs (patches), firewall executable code diffs (patches), price information, and manufacturing parts lists.

If the client's version of the file is not recognized, the latest version of the file to the client is downloaded to the client. The identifier can be part of the file name requested by the client, or, alternatively, only the identifier can be supplied to the server, and the diff(s) returned based on the identifier. The identifier can be, e.g., a hash, a checksum, a timestamp, version number and a digital signature.

A state description file that represents information about updates can be maintained and downloaded to the client prior to the client requesting the update, and the client can request the update based on the state description file.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
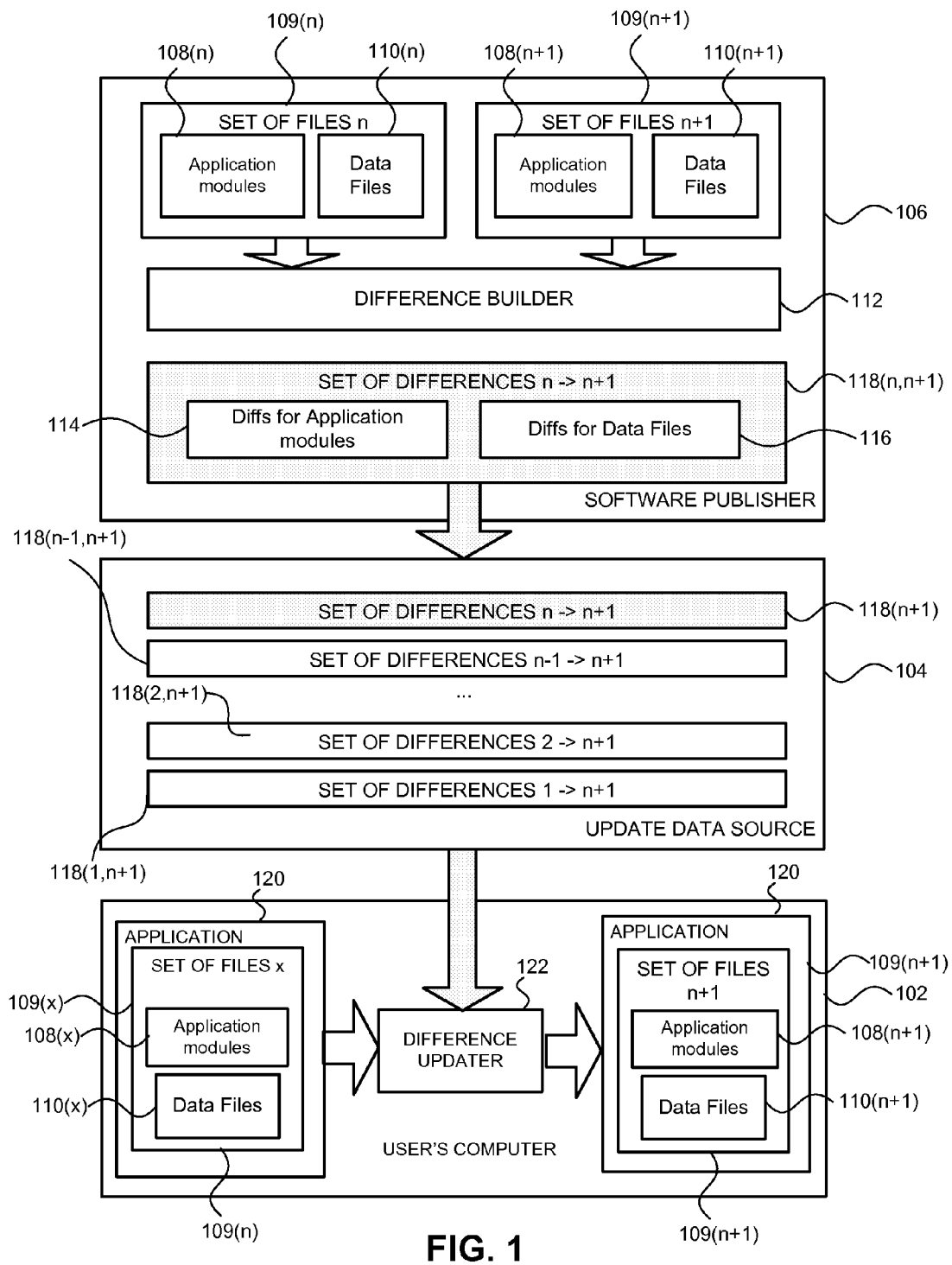
FIG. 1 illustrates, in block diagram form, the basic interaction between the various elements discussed herein.

Reference will now be made in detail to the preferred embodiments of the present invention, examples of which are illustrated in the accompanying drawings.

A hash function or hash algorithm is a function that examines the input data (or file) and produces an output of a fixed length, called a hash value. Two different files are unlikely to hash to the same hash value. The process of computing such a value is known as "hashing," and is used in cryptography and error-checking.

One way to limit the amount of information that needs to be exchanged between the client and the server is by embedding, in the file name, information about the state of the file on the client-side. For example, one way to do that is to incorporate an identifier into the file name that the client requests. Such an identifier can be, for example, a hash function, a check sum, a digital signature, a timestamp, etc. It is believed that using a hash is generally preferred.

In essence, the idea of a difference-based update is to convert a file, such as an application file, or a data file, from its current state A to a different state B. Conventionally, such as described in U.S. Pat. No. 6,651,249, state B may not be the final state, but may be an intermediate state. Such an update is conventionally performed by downloading a sequence of diffs that convert a file with the current state A into a sequence of subsequent states, such that after the final update, the file state represents the latest information.

In order to perform the difference-based update, the software on the client-side needs to determine the sequence of diffs that needs to be downloaded and installed, or applied, to those files that need updating. In order to do this, the software on the client-side needs to know three things: (1) its current state, (2) its final state, and (3) a set of updates available for this file. Generally, the current state of the file is available from the file itself. The final state can be received from the source of update, such as the server, while item (3) is generally the most resource-intensive from the perspective of the amount of work that the server needs to view. Accordingly, there is a need to reduce the amount of effort, or load, placed on the server that the server needs to perform in figuring out which updates to send to the client, in response to a client request for updates. Thus, the present invention is generally related to a mechanism for updating client-side files with only a relatively limited demand on the resources of the server. Generally, the mechanism is as follows:

An identifier that corresponds to the current version of the file being updated is generated. This identifier can be a hash, a check sum, a digital signature, or any number of other methods that assure that each version of the file corresponds to a unique identifier. The hash of the file can be used as part of a file name that is stored on a server, which is a source of update downloads.

When client software requests the update, the server side software compares the file name (or some other identifier) on the client-side that is being transmitted (and that also includes the hash as part of its name) with the set of file names that it has in its database. Based on the file name, which includes the identifier received from the client, the server can easily figure out which diff needs to be downloaded to the client, for example, through, for example, an FTP, a DFTP or an HTTP server.

Once received, the diff is applied to the file, and the file then assumes a final state, in other words, an updated state. Once the file has been updated, a new hash can be calculated, and again sent to the server for comparison. If the file name that includes the new hash corresponds to the latest version, then no further downloads needs to be done.

On the software publisher side, the database includes a set of files, each of which has its own history of changes. The files are typically placed on the update source, such as an FTP, DFTP or an HTTP server. The current file content, which represents the actual current state of the database, is described by a state description file. The state description file may include the names of the files in the set of files, as well as their hashes. For each file, in addition to its latest state, the server stores a set of diffs. Each patch file contains information necessary to convert the contents of the file from the version CURRENT−X version into the CURRENT version or the version CURRENT−Y, where Y<X. The names of the files can be formed, for example, as follows:

<target file name>.<hash>

The number of diffs is generally related to the desired "depth" of the difference-based update. Empirically, it may be said that when the difference between the current state of the file and the final state of the file, after the update, is more than 100%, it makes more sense to simply download the entire latest version of the file, rather than to patch it. However, there is some overhead associated on the client-side with the patching as well, therefore, typically the patch file/download entire file decision is shifted to a somewhat less than 80% update. Also, the entire file may be downloaded when the "cost" of applying the diff is greater than the "cost" of the file download.

Every time a new version of the final state of the file is released, the set of diffs are updated and a new set of files and diffs are published.

For any file 1 and file 2, it is possible to generate a diff Δ, such that file 1+Δ=file 2. For generating a sequence of updates, files that represent intermediate states can be compared, and the diffs calculated. The diffs are then stored in some compact form, such as described above. If the diff is greater than the file itself, then it makes more sense to store the file itself, rather than the diff.

It should be noted that some files easily lend themselves to diff generation, and others do not. For example, text files, ASCII files, MS Word files, etc., easily lend themselves to diff generation. On the other hand, encrypted files, or packed file formats, such as ZIP, RAR, etc., typically do not, since a change in any portion of the original file (from which the packed or encrypted file was created) typically results in a very large number of changes throughout the encrypted or packed file.

FIG. 1 illustrates, in block diagram form, the basic interaction between the various elements discussed herein. As shown in FIG. 1, the three primary "actors" are the user's computer, or client 102, a software publisher 106, and an update data source 104 (which may be different physical machines, or can be a single machine). The update data source 104 is typically a server, such as an FTP or an HTTP server with which the client 102 can interact, for example, through public networks, through LANs, through WANs, etc.

As an example, for purposes of the present discussion, the software publisher is an antivirus software vendor, although the technology described herein is not limited to antivirus applications. For example, the software publisher can be in the business of distributing price information, anti-spam software, anti-malware software, parts lists for manufacturing, legal databases, etc. The primary benefits of technology described herein are obtained where some information on the server side frequently changes, with unpredictable frequency—in other words, the data on the software publisher side can change every few minutes, or might not change at all for many hours.

Again, using the antivirus application as an example, on the client 102 side, there is an application 120, such as antivirus or Internet security software, which consists of executable code (application modules 108x and data files 110x). Collectively, these form a set of files 109x that potentially need an update. In this discussion, the index "x" refers to any version of the file, including a version that the server 104 might not expect. Also, throughout this discussion, n is the current version, (n+1) is the next version, which "comes into existence" once something needs to be changed, in other words, the latest version.

Also on the client-side is a difference updater 122, which, based on the current state of the files 109x and the information received from the update source 104 generates an updated set of files 109(n+1), with executable code of the application modules 108(n+1) and data files 110(n+1).

In the context of antivirus and anti-spam technology, it is frequently convenient to break up the data file into several files, rather than pack all the information into a single file. For example, one of these files might be a set of virus masks, another file might be a set of rules for handling the files, and another file might contain file names. In this example, therefore, there might be four files that potentially require updates—the application module files, and the data files themselves. Note also that the frequency of updates of these files is often not the same. For example, updating the application modules 108 (in other words, patching the executable code of the application itself) may be done relatively infrequently, for example, with a gap of weeks or sometimes even months between updates. Data files 110, such as rules for handling the viruses might be updated more frequently. Yet other files, such as virus masks and virus names might be updated on a nearly continuous basis. Thus, it will be appreciated that in the process of difference-based software updates, only some of the sets of files need to be updated for each particular client, but not necessarily all the files.

Returning again to FIG. 1, on the software publisher side, at some point in time, there is a current set of files 109(n), where the index n represents the current version. These include application modules 108(n) and data files 110(n). At some later point in time, a new version (n+1) "comes into existence." For example, this may be due to a patch in the application module, the identification of a new virus, a change in the rules for how some of the viruses are handled, etc. These are designated by the (n+1) index in FIG. 1—in other words, a set of files 109(n+1) that includes application module files 108(n+1) and data files 110(n+1).

A difference builder 112 is a software module or procedure that identifies and selects the appropriate differences between the previous set of files (with the index n, and the new latest set of files, identified with the index (n+1)). The difference builder 112 then generates a set of differences 118(n)(n+1), as described earlier, that describe how to convert a file with the index n to a file with the index (n+1). For example, these can be differences 114 for application module files (in other words, for executable code) and differences 116 for data files.

These differences 114, 116 are then transmitted to the update data source 104, which, as noted earlier, is usually an FTP, a DFTP or an HTTP server. On the server 104, therefore, there are published a set of differences that corresponds to the difference between the latest version of the files (n+1) and all earlier versions of the files, in other words, differences 1 . . . n.

Figure 2:
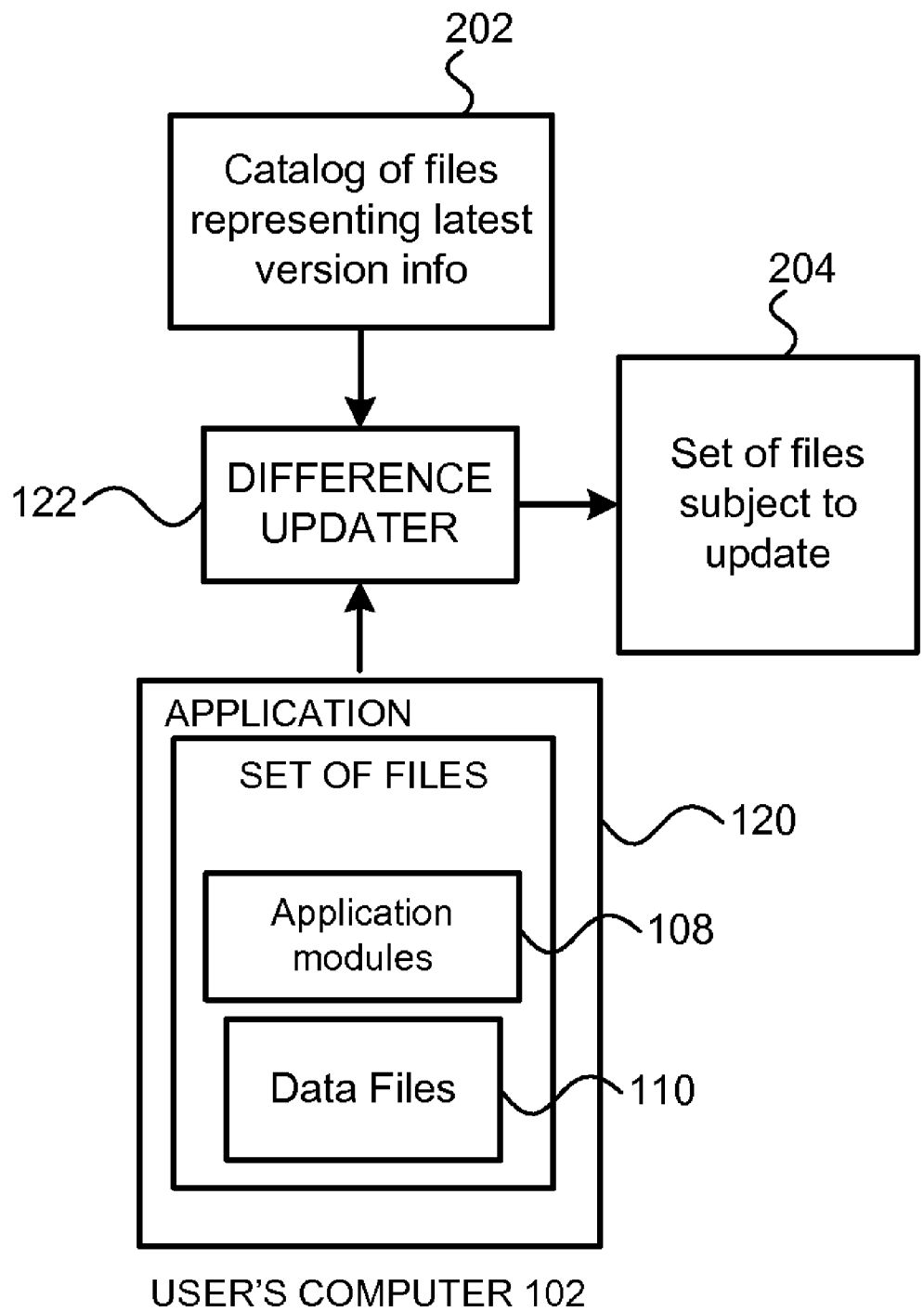
FIG. 2 illustrates an optimization that may be added to the process of identifying which versions of which files need to be updated.

FIG. 2 illustrates an optimization that may be added to the process of identifying which versions of which files need to be downloaded. As shown in FIG. 2, the difference updater 122 on the client-side has access to its own file information—in other words, the application modules files 108 and the data files 110. The difference updater can also download, from the server 104 some information 202 about which files that need to be updated. This can be, for example, a state description file of all the files that are to be updated, and which lists the latest versions, or a small list of files that have changed recently, or a list of files whose names correspond to the latest versions of those files (e.g., using a hash, a version number, etc.). The client can then compare the state description file with the versions of the files it has, and easily derive which files 204, if any, are subject to updating.

This may be particularly useful for applications that themselves contain multiple sub-applications. For example, many "Internet Security" products are actually an agglomeration of several products—a firewall, an antivirus module, an anti-spam module, etc. Each of these can have its own set of application files that may be subject to updates, and its own set of data files that may be subject to updates. Thus, as shown in FIG. 2, the client-side software can exchange only a small subset of information with the server 104, optimizing the process.

Figure 3A:
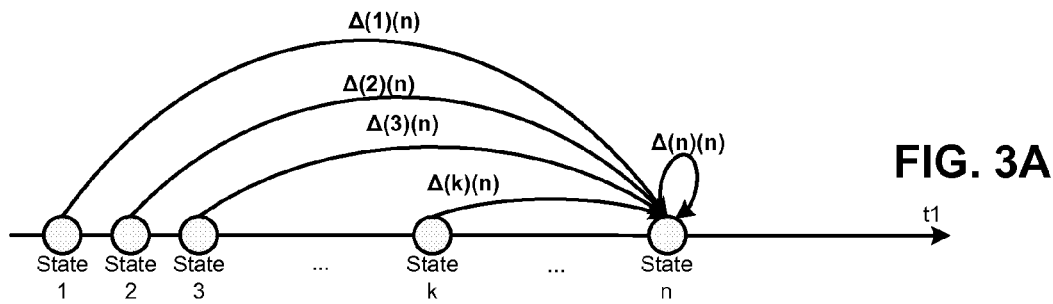
FIGS. 3A-3K illustrate the various possibilities that might occur during the process of updating the set of differences when a new version appears.

FIGS. 3A-3K illustrates the process of updating the differences when a new update has been added. In this case, the current state of the differences is labeled state n, and the next state, in other words, the state that will be the current state once the diffs are generated, is labeled (n+1). As shown in FIG. 3A, for state n, the diff $\Delta(n)(n)$ is the null diff. Other diffs, $\Delta(k)(n)$, ... $\Delta(3)(n)$, $\Delta(2)(n)$, $\Delta(1)(n)$ point from the prior state ( ... k ... 3, 2, 1) to the current state n, at time t1.

Figure 3B:
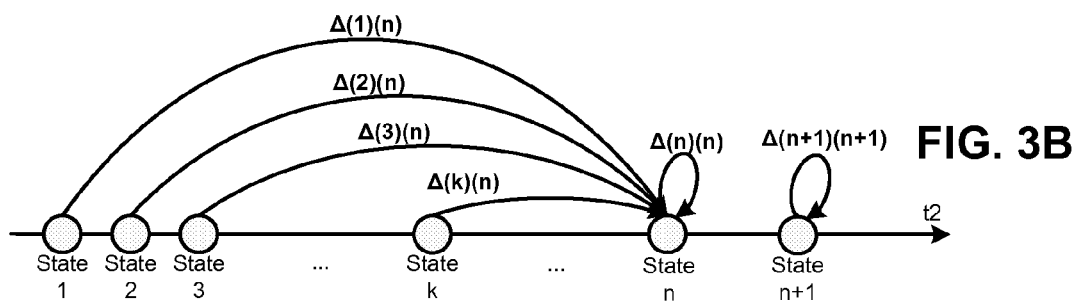

FIG. 3B illustrates the situation when the state (n+1) "comes into existence." At that point, there are two null diffs, $\Delta(n)(n)$ and $\Delta(n+1)(n+1)$, at the time t2.

Figure 3C:
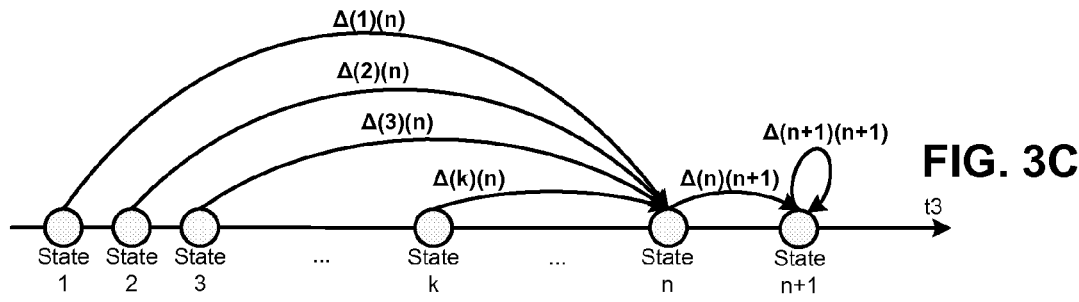

FIG. 3C illustrates an intermediate state of the updates, where the diff that was previously $\Delta(n)(n)$ has been replaced by the diff $\Delta(n)(n+1)$. The other diffs remain as they are—in other words, there is a path from any prior state ultimately to the state (n+1), but not necessarily a direct path.

Figure 3D:
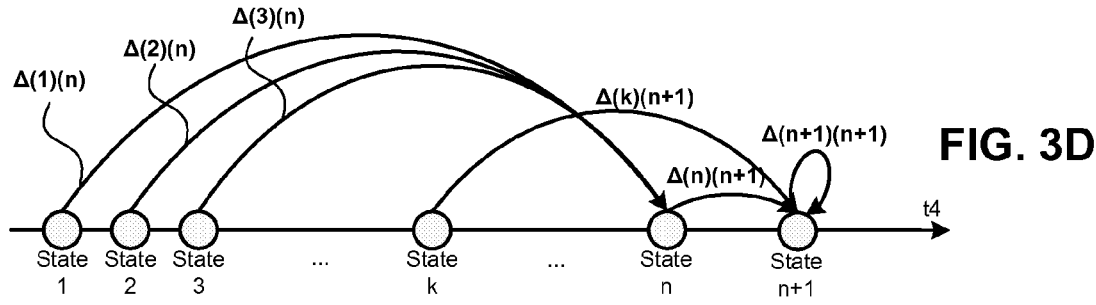

FIG. 3D illustrates the next step in the process, as the diffs that used to point to the state n are replaced with diffs that point to the state (n+1). In the case of FIG. 3D, the diff $\Delta(k)(n)$ is replaced with the diff $\Delta(k)(n+1)$.

Figure 3E:
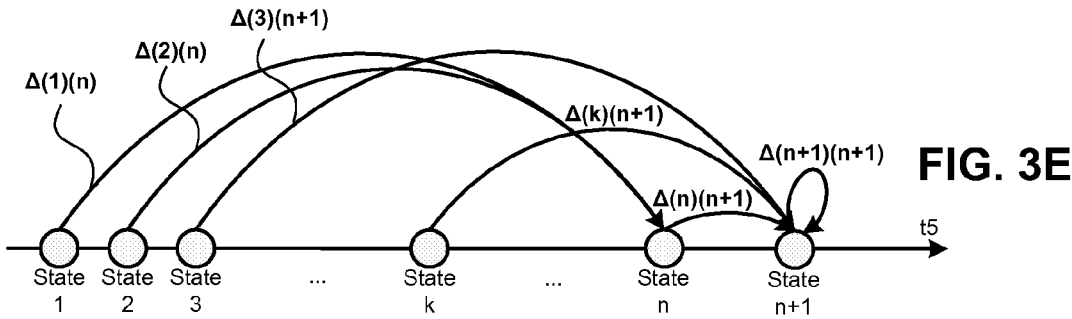

FIG. 3E illustrates the continuation of this process, at the time t5. Here, the diff that used to point from state 3 to state n (the diff formerly labeled as $\Delta(3)(n)$) is replaced by the diff $\Delta(3)(n+1)$.

Figure 3F:
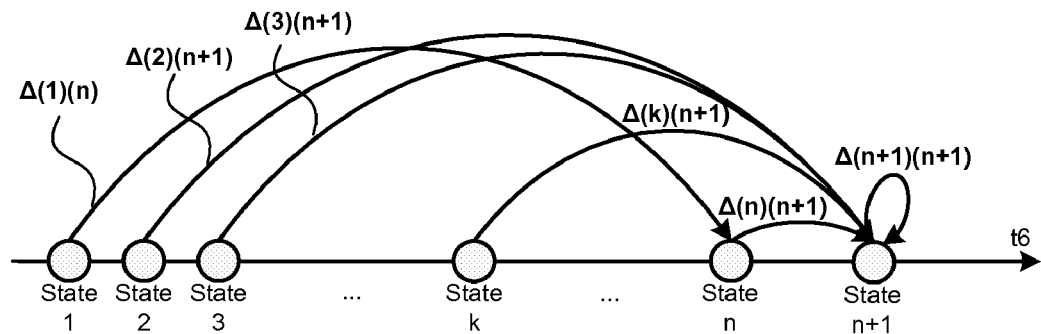

FIG. 3F illustrates the situation at time t6, where the diff $\Delta(2)(n)$ has been replaced by the diff $\Delta(2)(n+1)$. The process is completed when, at the time t7, as shown in FIG. 3G, the diff $\Delta(1)(n)$ is replaced by the diff $\Delta(1)(n+1)$.

Figure 3G:
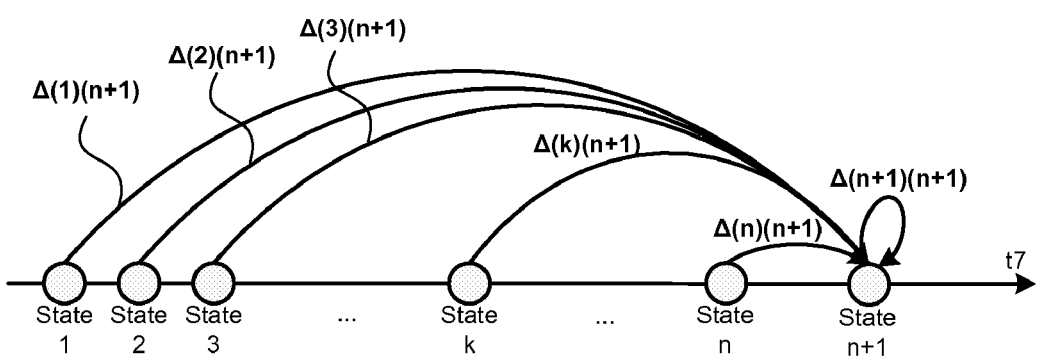
Figure 3H:
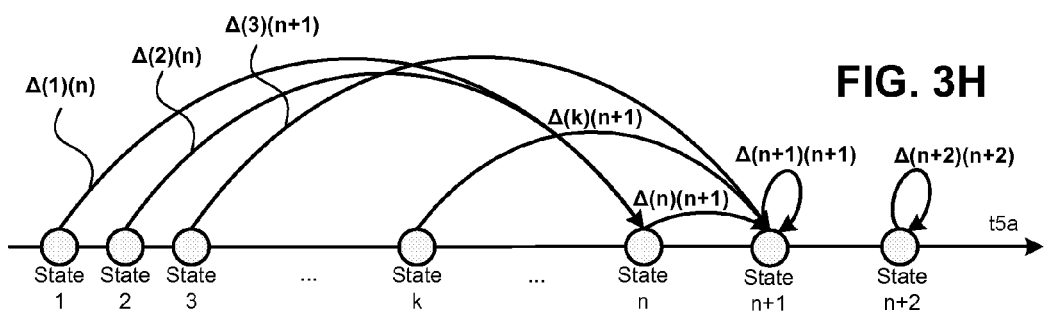

FIGS. 3H-3K illustrates the situation where another update appeared before all the diffs were fully updated. For example, in the case shown in FIG. 3E, at the time t5, another state, state (n+2), appears, with the time now designated t5a. In this case, the null diff for this state is $\Delta(n+2)(n+2)$, as shown in FIG. 3H. However, at this point, there is no path yet to the state (n+2) from the previous states.

Figure 3I:
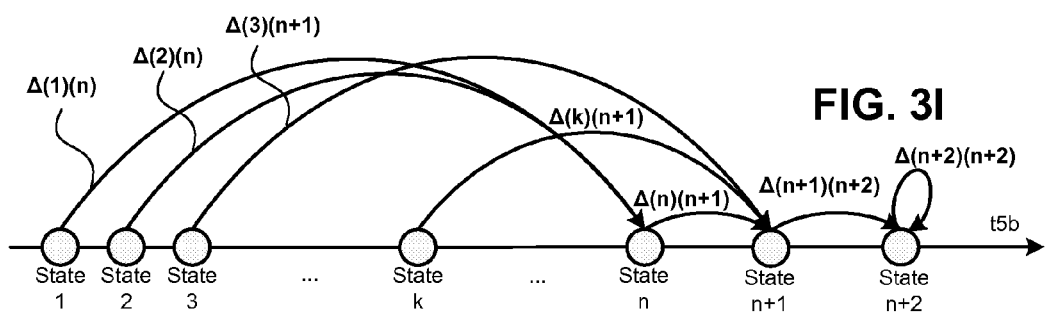
Figure 3J:
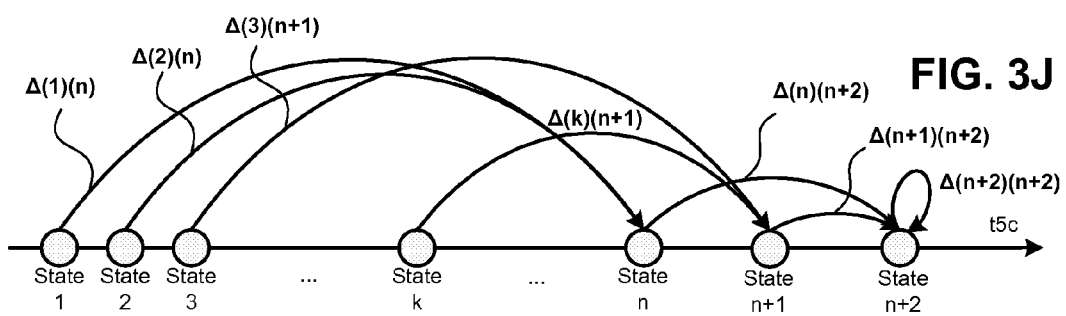

As shown in FIG. 3I, rather than continue with the process illustrated in FIGS. 3F and 3G, a diff $\Delta(n+1)(n+2)$ is added, for the path from the state (n+1) to the state (n+2). This diff replaces the null diff $\Delta(n+1)(n+1)$. With the addition of this diff, there is now a path from any prior state to the final state (n+2). As shown in FIG. 3J, the diff $\Delta(n)(n+1)$ is replaced by the diff $\Delta(n)(n+2)$, which points from the state n to the state (n+2).

Figure 3K:
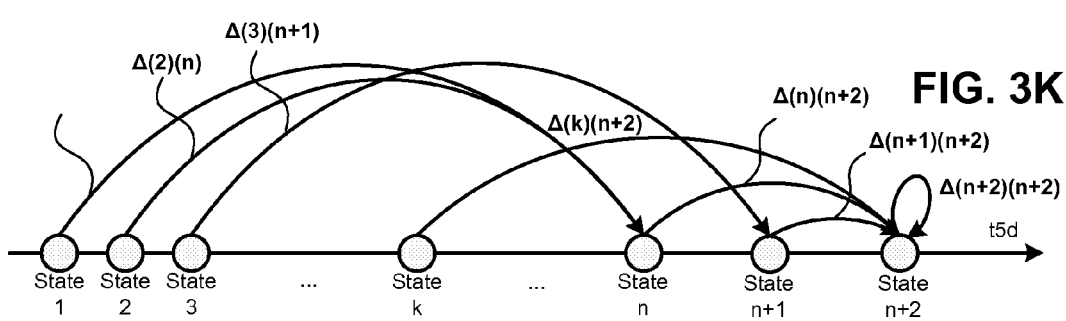

As shown in FIG. 3K, the diff $\Delta(k)(n+1)$ is replaced by the diff $\Delta(k)(n+2)$. The process continues according to the described model, until all the diffs point from the previous state to the final state (n+2).

It will be readily appreciated that in the case of yet another "next" state, such as (n+3), (n+4), etc. were to appear before the process shown in these figures was finished, the diffs would be generated in the same manner, so that ultimately they point from any prior state to the latest state (n+3), (n+4), or whichever state is latest prior to the completion of the diff updates.

Figure 4:
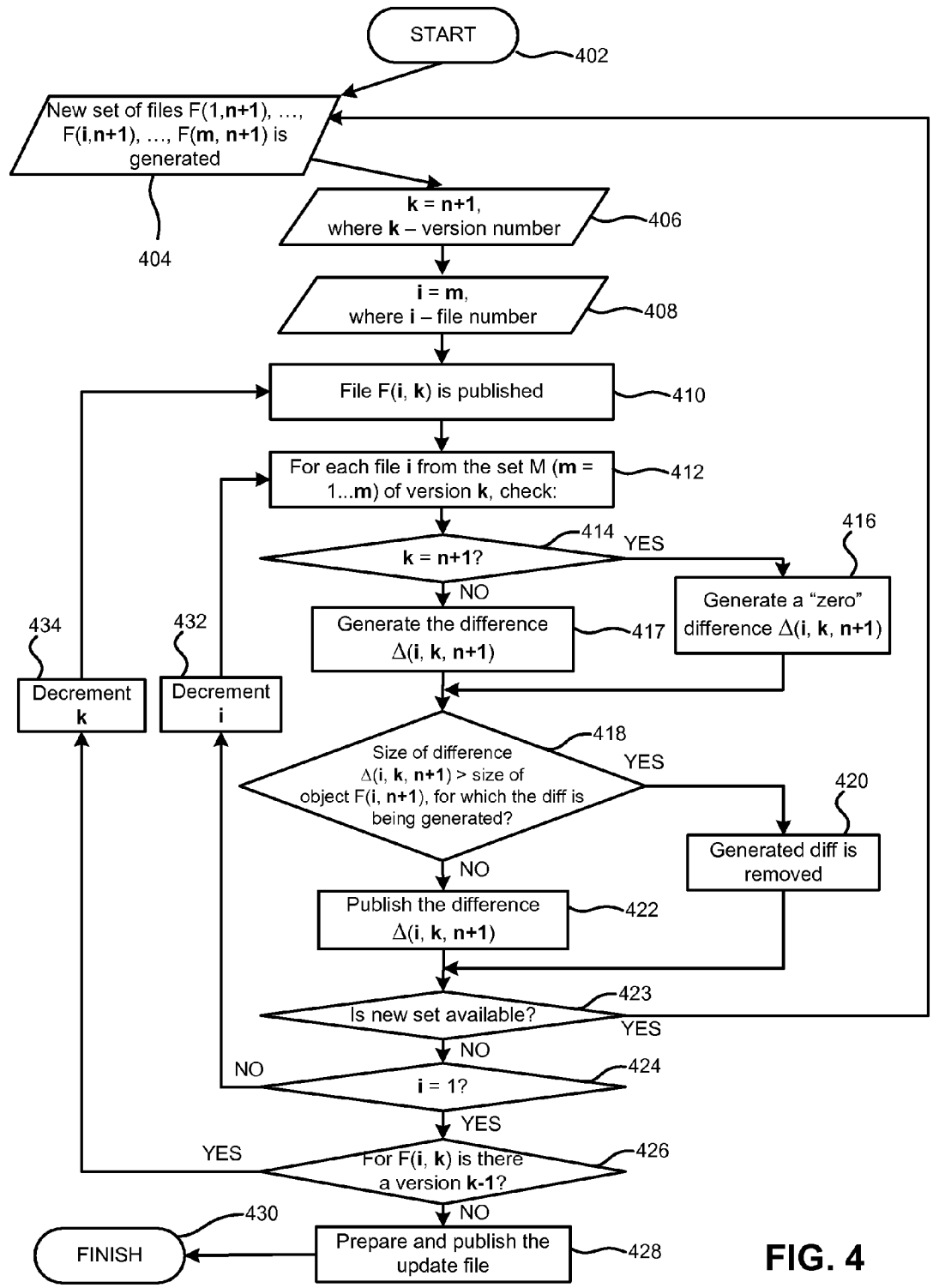
FIG. 4 illustrates an exemplary difference-based update algorithm on the software publisher side.

FIG. 4 illustrates an exemplary algorithm on the software publisher side that can be used to implement the invention. As shown in FIG. 4, in step 402, the process is started. In step 404, a new set of files F(i, n+1) is generated, that represents new versions of the previous files at state n, and "i" is the index of the file. In step 406, where k is set to (n+1), and in step 408, where i is set to n, the current file index. In step 410, the new file F(i, k) is published, meaning, it is made available on the server 104. In step 412, for each file, the following is checked:

In step 414 the algorithm checks if k=n. If it is, then, in step 416, a zero, or null, difference is generated. If k is not equal to n, then, in step 417, the difference corresponding to this file in this version is generated. Following steps 417 or 416, the algorithm then checks, in step 418, whether the size of the difference is greater than the size of the file for which it is being generated. If it is, then, in step 420, that difference is deleted. Otherwise, in step 422, the difference is published on the server 104. After step 422, in step 423, the algorithm checks if a new set is available. If it is, then the algorithm returns to step 404. Otherwise, the algorithm proceeds to step 424. After step 420 or 422, in step 424, the algorithm checks whether i is equal to 1, in other words, whether there are any files still left for which differences need to be generated. If not, then, in step 432, i is decremented by 1, and the algorithm returns to step 410 otherwise, in step 426, the algorithm checks whether, for that file, there is a prior version (k−1). If there is, then k is decremented by 1 in step 434, and the algorithm returns to step 408. Otherwise, the update file is published in step 428. The process finishes in step 430.

Figure 5:
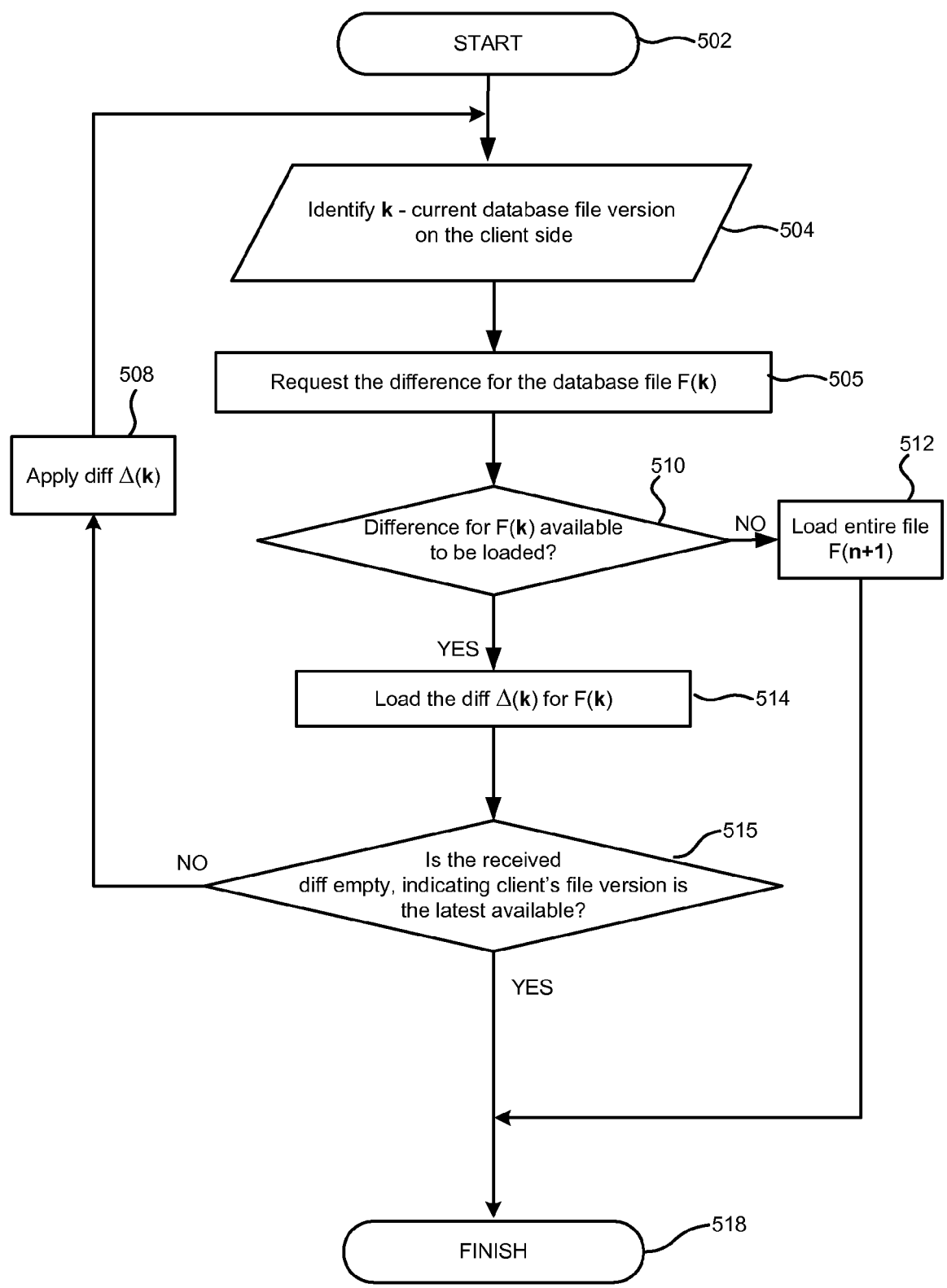
FIG. 5 illustrates a relatively simple case of the algorithm that may be employed on the client side.

FIG. 5 illustrates a relatively simple case of the algorithm that may be employed on the client side, according to one embodiment of the invention. As shown in FIG. 5, after the client side algorithm starts in step 502, the algorithm identifies the current database file version on the client side (step 504). In step 505, the algorithm requests the difference for that particular file. If, in step 510, the difference for that file is available to be loaded, then, the algorithm proceeds to step 514, loading the diff $\Delta(k)$ for the file F(k). Then, if the diff file is empty or null in step 515, which means that the client's version of the file is the latest, and the process can finish in step 518. If, in step 510, there is no difference available to be loaded, then, in step 512, the entire file F(n+1) is loaded, and the process finishes in step 518. In step 515, if the received diff is not a null diff, then, in step 508, the diff is applied to update the client side file, and the algorithm returns to step 504.

Figure 6:
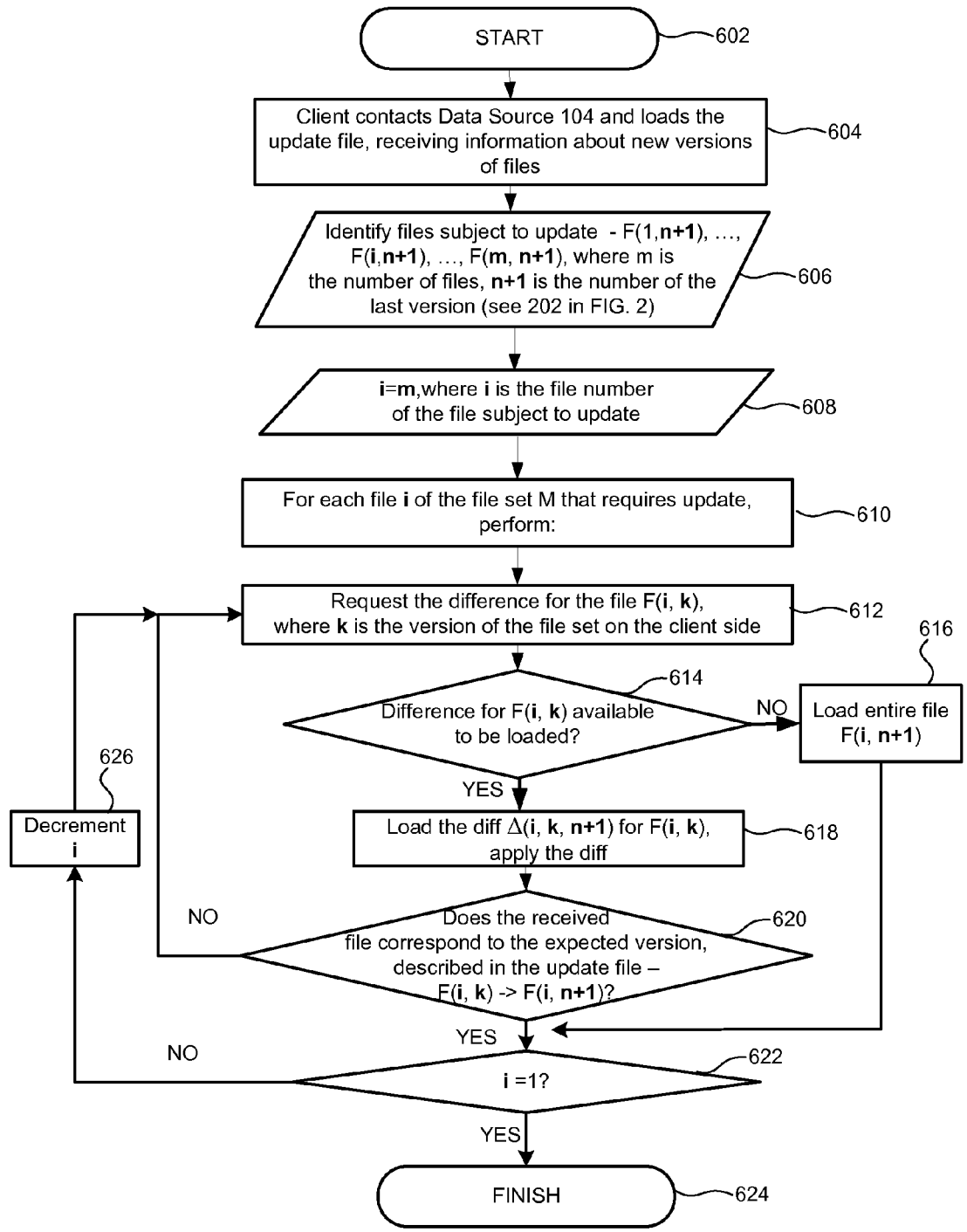
FIG. 6 illustrates another exemplary difference-based update algorithm on the client side.

FIG. 6 illustrates another exemplary algorithm on the client-side that can be used to implement the invention. As shown in FIG. 6, the algorithm on the client-side starts at step 602. The algorithm then contacts the server 104, and loads the update file (e.g., a state description file) from the server 104, thereby receiving information about which files need to be updated. (See also discussion of FIG. 2, and note that this step is optional.) In step 606, files that need to be updated, if any, are identified, for example, using the state description file of 202. (This step is optional—all the files can be subject to a diff download, regardless of whether the diff is a null.)

In step 608, "i" is the index of the file that is subject to the update (in other words, "i" can represent the virus mask file, the rules file, the virus name file, etc.). In step 610, for each file that requires update, the following will be done: in step 612, the difference for the file F(i, k) will be requested from the server 104, where k is the version number of the file set 109 on the client-side. In step 614, the algorithm will determine whether there is a difference available to be downloaded for that file. If not, then in step 616, the entire file that represents the latest version of that file will be downloaded. If there is a difference to be downloaded (step 618), then the algorithm on the client-side will download the file and apply the files 109 that it has.

In step 620, if the file corresponds to the expected version, then, in step 622, the algorithm will ask whether i is equal to 1, in other words whether this is the last file subject to the updating. If it is, then the algorithm will finish in step 624. If it is not, then in, step 626, the index "i" will be decremented by 1, and the process will return to step 612. Also, after step 616, the algorithm will proceed to step 622, to check if any files remain to be updated.

Figure 7:
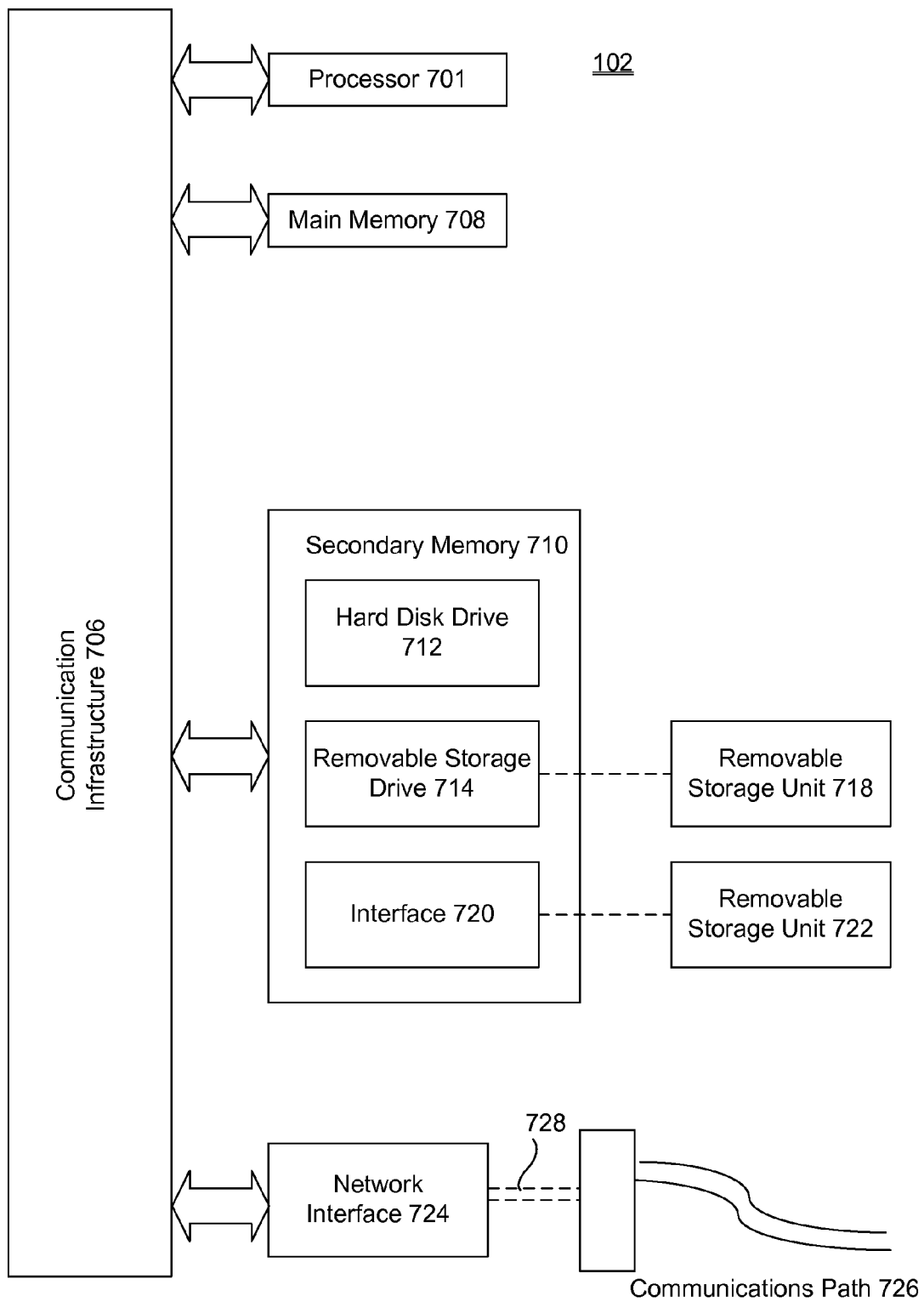
FIG. 7 illustrates an example of a computer on which the invention may be implemented.

An example of the computing system on which the present invention can be implemented, such as the client-side computer 102, or a server-side computer 104, is illustrated in FIG. 7. The computing system 102 includes one or more processors, such as processor 701. The processor 701 is connected to a communication infrastructure 706, such as a bus or network. Various software implementations are described in terms of this exemplary computer system. After reading this description, it will become apparent to a person skilled in the relevant art how to implement the invention using other computer systems and/or computer architectures.

Computing system 102 also includes a main memory 708, preferably random access memory (RAM), and may also include a secondary memory 710. The secondary memory 710 may include, for example, a hard disk drive 712 and/or a removable storage drive 714, representing a magnetic tape drive, an optical disk drive, etc. The removable storage drive 714 reads from and/or writes to a removable storage unit 718 in a well known manner. Removable storage unit 718 represents a magnetic tape, optical disk, or other storage medium that is READ by and written to by removable storage drive 714. As will be appreciated, the removable storage unit 718 can include a computer usable storage medium having stored therein computer software and/or data.

In alternative implementations, secondary memory 710 may include other means for allowing computer programs or other instructions to be loaded into computing system 102. Such means may include, for example, a removable storage unit 722 and an interface 720. An example of such means may include a removable memory chip (such as an EPROM, or PROM) and associated socket, or other removable storage units 722 and interfaces 720 which allow software and data to be transferred from the removable storage unit 722 to computing system 102.

Computing system 102 may also include one or more communications interfaces, such as communications interface 724. Communications interface 724 allows software and data to be transferred between computing system 102 and external devices. Examples of communications interface 724 may include a modem, a network interface (such as an Ethernet card), a communications port, a PCMCIA slot and card, etc. Software and data transferred via communications interface 724 are in the form of signals 728 which may be electronic, electromagnetic, optical or other signals capable of being received by communications interface 724. These signals 728 are provided to communications interface 724 via a communications path (i.e., channel) 726. This channel 726 carries signals 728 and may be implemented using wire or cable, fiber optics, an RF link and other communications channels. In an embodiment of the invention, signals 728 comprise data packets sent to processor 701. Information representing processed packets can also be sent in the form of signals 728 from processor 701 through communications path 726.

The terms "computer program medium" and "computer usable medium" are used to generally refer to media such as removable storage units 718 and 722, a hard disk installed in hard disk drive 712, which provide software to the computing system 102.

Computer programs are stored in main memory 708 and/or secondary memory 710. Computer programs may also be received via communications interface 724. Such computer programs, when executed, enable the computing system 102 to implement the present invention as discussed herein. In particular, the computer programs, when executed, enable the processor 701 to implement the present invention. Where the invention is implemented using software, the software may be stored in a computer program product and loaded into computing system 102 using removable storage drive 714, hard drive 712 or communications interface 724.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A method of software updates, the method comprising:
    (a) at a server, generating a set of differences between a latest version of a file and a plurality of prior versions of the file, wherein the differences convert any of the plurality of prior versions into the latest version, but not to any other version;
    (b) publishing the set of differences for downloads by clients, wherein, when size overhead from downloading and applying a difference is greater than size overhead associated with downloading an entire file, that difference is not published;
    (c) in response to a client requesting an update to a client's version of the file and the client providing an identifier that defines the client's version of the file, providing, to the client, a difference between the client's version of the file and a latest version of the file;
    (d) maintaining a state description file representing files subject to update, wherein the state description file is downloaded to the client, and wherein the client requests the update based on the state description file; and
    (e) removing at least some earlier-generated differences.

2. The method of claim 1, wherein the differences are published on any of an FTP server, a DFTP server and an HTTP server.

3. The method of claim 1, wherein the file includes any of virus signatures, spam signatures, spam handling rules, firewall rules, virus names, virus handling rules, antivirus executable code patches, anti-spam executable code patches, firewall executable code patches, anti-phishing database updates, intrusion detection signature databases, price information, and manufacturing parts lists.

4. The method of claim 1, wherein, if the client's version of the file is not recognized, the latest version of the file is downloaded to the client.

5. The method of claim 1, wherein the identifier is part of a file name requested by the client.

6. The method of claim 1, wherein the identifier includes any of a hash, a checksum, a timestamp, version number and a digital signature.

7. The method of claim 1, wherein the differences are added to previously published differences.

8. The method of claim 1, wherein the differences are added as replacements of previously published differences.

9. A system for software updates comprising:
    (a) a processor and memory;
    (b) a latest version of the file;
    (c) a plurality of prior versions of a file;

(d) a set of differences between the latest version of a file and the plurality of prior versions of the file, wherein the differences convert any of the plurality of prior versions into the latest version, but not to any other version;

(e) a server on which the set of differences are published for downloads, wherein, when size overhead from downloading and applying a difference is greater than size overhead associated with downloading an entire file, that difference is not published, wherein, in response to a client requesting an update to a client's version of the file and the client providing an identifier that defines the client's version of the file, the server provides, to the client, a difference, out of the set of differences, between the client's version of the file and a latest version of the file, at the server, a state description file representing files subject to update, wherein the state description file is downloaded to the client, and wherein the client requests the update based on the state description file; and means for removing at least some earlier-generated differences.

10. The system of claim 9, wherein the file includes any of virus signatures, spam signatures, spam handling rules, firewall rules, virus names, virus handling rules, antivirus executable code patches, anti-spam executable code patches, firewall executable code patches, anti-phishing database updates, intrusion detection signature databases, price information, and manufacturing parts lists.

11. The system of claim 9, wherein, if the client's version of the file is not recognized, the latest version of the file is downloaded to the client.

12. The system of claim 9, wherein the identifier is part of a file name requested by the client.

13. The system of claim 9, wherein the identifier includes any of a hash, a checksum, a timestamp, version number and a digital signature.

14. A method of software updates, the method comprising:

a) at a server, generating a set of differences between a latest version a file and each previous version of the file, wherein the difference contain information to convert a file to a subsequent version of the file up to the latest version;

b) publishing the differences on an update source, wherein, when size overhead from downloading and applying a difference is greater than size overhead associated with downloading an entire file, that difference is not published;

c) in response to a client requesting an update to a client's version of the file and the client providing an identifier that defines the client's version of the file, providing, to the client, differences between the client's version of the file and one of the subsequent version of the file, up to latest version of the file;

(d) maintaining a state description file representing files subject to update, wherein the state description file is downloaded to the client, and wherein the client requests the update based on the state description file; and (e) removing at least some earlier-generated differences.

15. A method of software updates, the method comprising:

(a) at a server, generating a set of differences between a latest version of a file and a plurality of prior versions of the file, wherein the differences convert any of the plurality of prior versions into the latest version, but not to any other version;

(b) publishing the set of differences, wherein, when size overhead from downloading and applying a difference is greater than size overhead associated with downloading an entire file, that difference is not published; and (c) in response to a client requesting an update to a client's version of the file and the client providing an identifier corresponding to the client's version of the file, providing, to the client, a difference between the client's version of the file and one of (i) the latest version of the file, and (ii) a version of the file prior to the latest version;

(d) maintaining a state description file representing files subject to update, wherein the state description file is downloaded to the client, and wherein the client requests the update based on the state description file; and (e) removing at least some earlier-generated differences.

16. A method of software updates, the method comprising:

(a) on a client-side, for a file to be updated, generating an identifier of the file, wherein the identifier includes on any of a hash of the file, a checksum of the file, a timestamp of the file, a version number of the file and a digital signature of the file;

(b) transmitting the identifier to a server;

(c) receiving, from the server, a difference between a latest version of the file and the file on the client-side, the difference determined based on the identifier and the latest version of the file, wherein the difference corresponds to an update from a current version of the file to the latest version of the file, and wherein, when size overhead from downloading and applying a difference is greater than size overhead associated with downloading an entire file, that difference is not published; and (d) on the client-side, updating the file to be updated based on the difference;

(e) downloading a state description file representing files subject to update, wherein the state description file is downloaded to the client, and wherein the client requests the update based on the state description file.

17. A system for software updates comprising:

(a) a processor and memory;

(b) for a file to be updated, means for generating a file name that includes on any of a hash of the file, a checksum of the file, a timestamp of the file, a version number of the file and a digital signature of the file;

(c) on a client-side, means for transmitting the file name to a server;

(d) means for receiving, from the server, a difference between a latest version of a file and the file on the client-side, the difference determined based on the file name and the latest version of the file, wherein the difference corresponds to an update from any prior version of the file to the latest version of the file, and wherein, when size overhead from downloading and applying a difference is greater than size overhead associated with downloading an entire file, that difference is not published; and (e) a difference updater that updates the file based on the difference;

(f) a state description file representing files subject to update that is generated from the server, wherein the state description file is downloaded to the client, and wherein the client requests the update based on the state description file.

18. A computer usable storage medium having computer program logic for software updates stored thereon, the computer program logic used for executing on a processor, the computer program logic comprising:

computer program code means for generating, at a server, a set of differences between a latest version of a file and a plurality of prior versions of the file, wherein the differences convert any of the plurality of prior versions into the latest version, but not to any other version;

computer program code means for publishing the set of differences for downloads by clients, wherein, when size overhead from downloading and applying a difference is greater than size overhead associated with downloading an entire file, that difference is not published;

computer program code means for, in response to a client requesting an update to a client's version of the file and the client providing an identifier that defines the client's version of the file, providing, to the client, a difference between the client's version of the file and the latest version of the file, the difference determined based on the file name, wherein the difference corresponds to an update from client's current version of the file;

computer program code means for maintaining a state description file representing files subject to update, wherein the state description file is downloaded to the client, and wherein the client requests the update based on the state description file; and computer program code means for removing at least some earlier-generated differences.

19. A computer useable storage medium having computer program logic for software updates stored thereon, the computer program logic used for executing on a processor, the computer program logic comprising:

(a) for a file to be updated, on a client side, computer program code means for generating, at a server, a file name that includes on any of a hash of the file, a checksum of the file, a timestamp of the file, a version number of the file and a digital signature of the file;

(b) computer program code means for means for transmitting the file name to the server;

(c) computer program code means for receiving, from the server, a difference between a latest version of a file and the file on the client-side, the difference determined based on the file name and the latest version of the file, wherein the difference corresponds to an update from any prior version of the file to the latest version of the file;

(d) computer program code means for updating the file based on the difference;

(e) computer program code means for maintaining a state description file representing files subject to update, wherein the state description file is downloaded to the client, and wherein the client requests the update based on the state description file.

* * * * *